Oct. 7, 1969 V. L. COX ET AL 3,471,632
AMBIENT DEIONIZING APPARATUS FOR INSULATORS
Filed Jan. 18, 1968 3 Sheets-Sheet 1
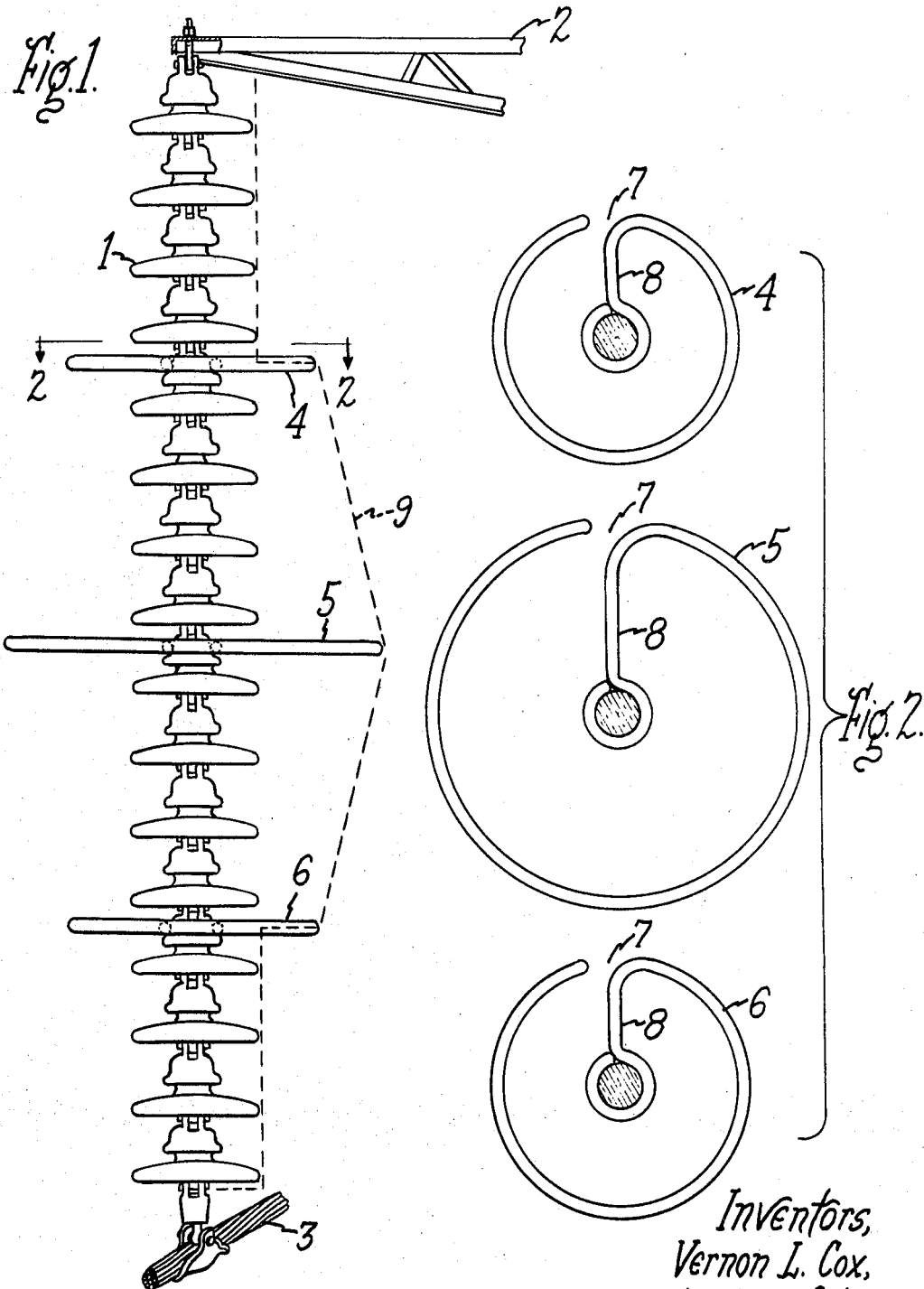
Inventors,
Vernon L. Cox,
Charles H. Titus,
by Vale P. Myles
Their Attorney.

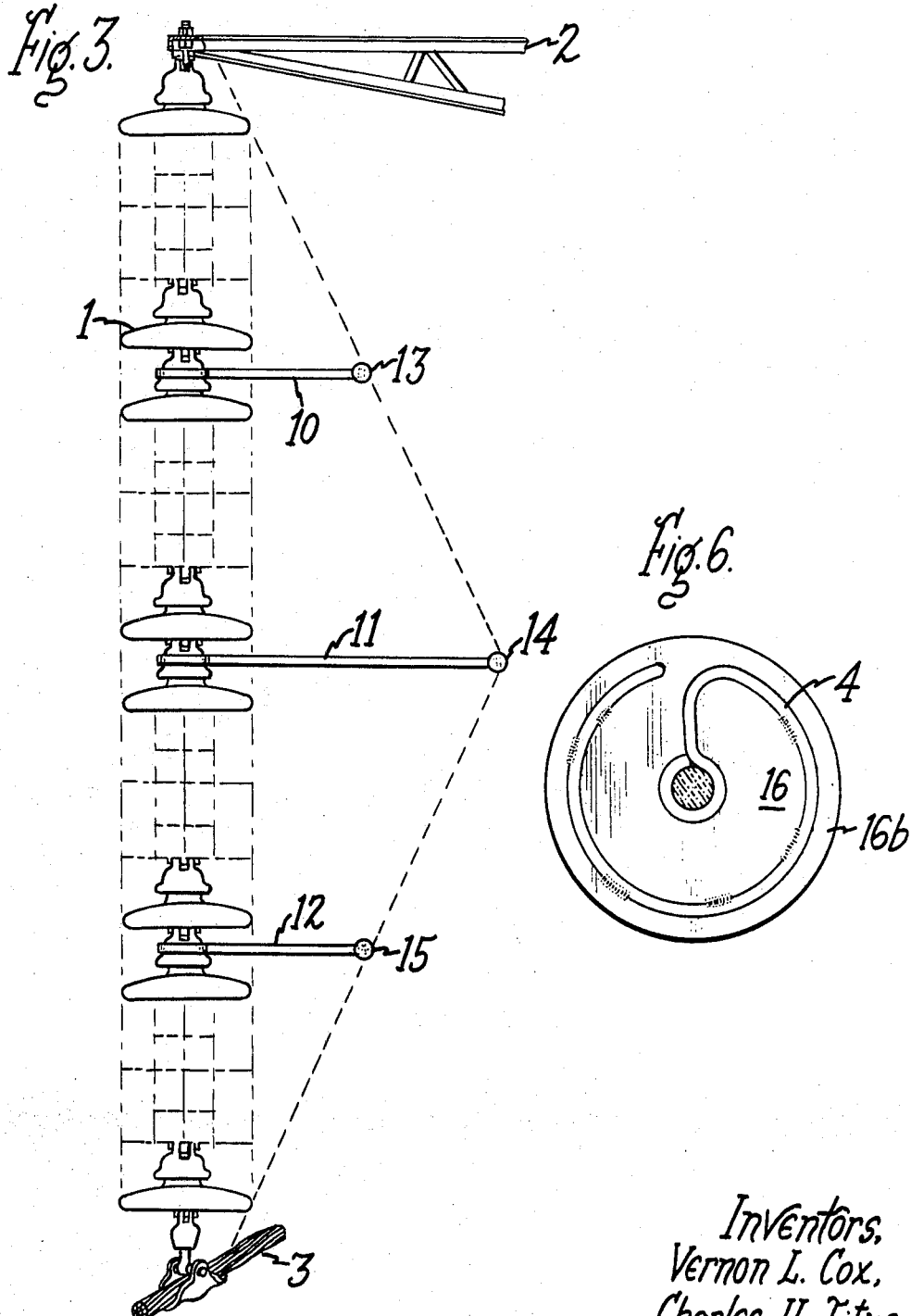

Oct. 7, 1969   V. L. COX ET AL   3,471,632
AMBIENT DEIONIZING APPARATUS FOR INSULATORS
Filed Jan. 18, 1968   3 Sheets-Sheet 3
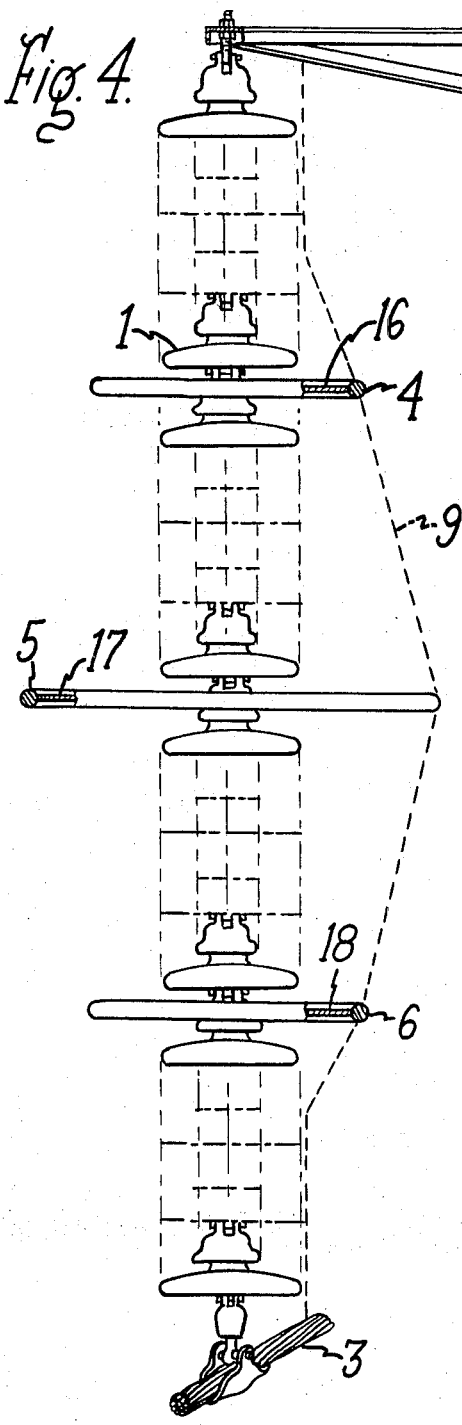
Fig. 4.
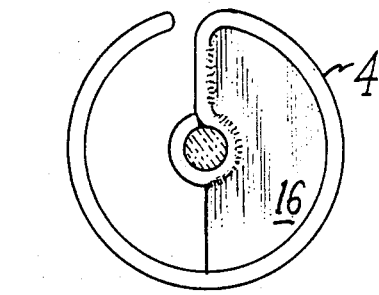
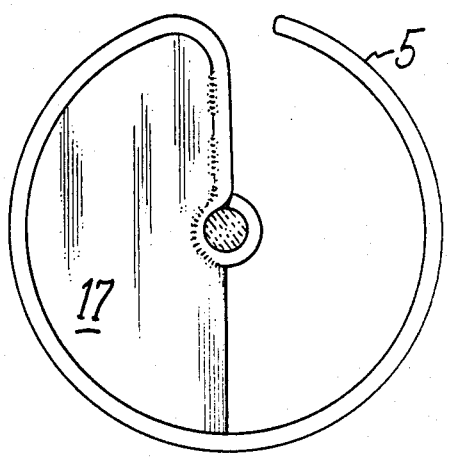
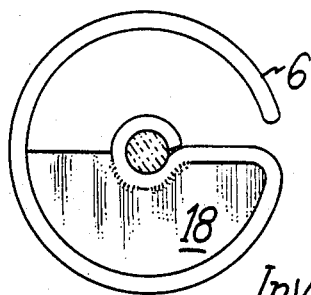
Fig. 5.
Inventors,
Vernon L. Cox,
Charles H. Titus,
by  Vale P. Myles
Their Attorney.

United States Patent Office 3,471,632
Patented Oct. 7, 1969

3,471,632
AMBIENT DEIONIZING APPARATUS FOR INSULATORS
Vernon L. Cox, Broomall, and Charles H. Titus, Newtown Square, Pa., assignors to General Electric Company, a corporation of New York
Filed Jan. 18, 1968, Ser. No. 698,877
Int. Cl. H01b 17/48, 17/46, 17/44
U.S. Cl. 174—141                                    12 Claims

ABSTRACT OF THE DISCLOSURE

Ambient dionizing apparatus for elongated high voltage insulators, including loop-shaped arc-rotating terminals attached to such insulators for rotating and deionizing arcs to diffuse the ionized vapor formed by arcs across the insulators. Also provided is a combination of arc terminals and plate-like baffle members disposed along the length of an insulator to separate the ionized vapor formed by an arc into a plurality of zones that are quickly cooled and diffused to inhibit re-establishment of an arc across the insulator when power is restored to the system containing the insulator.

---

In electric power transmission systems having "extra high" transmission voltages, i.e., voltages in excess of 345 kilovolts, when protective circuit breakers open due to a fault or grounded condition occurring, it is necessary to reclose them as quickly as possible after the fault has been cleared or the flashover has been extinguished. The desirability of such rapid restoration of service has always been recognized but as higher voltage trunk transmission lines have come into common use, the need for more rapidly restoring power after a fault has been accentuated due to the greater service demands placed on individual transmission lines because of the added power each line is able to supply at the higher transmission voltages. Heretofore, approximately half a second has been allowed to elapse before a power line is reenergized following a fault or flashover to ground. However, it is becoming apparent that this interval must be shortened if expanded use of higher transmission voltage is not to be hampered by system service demands in the future.

Arcs to ground on transmission systems usually occur across the suspension insulator strings employed in the system to suspend power transmission lines from towers, or to space the transmission lines from ground potential objects that they must pass near. Accordingly, a significant improvement in system service would be afforded by reducing the time required before power can be restored to the line following such a flashover. Thus, the problem facing high voltage transmission system designers is really a two-faceted one, in that the time required to restore service following a fault can be reduced by either quickly extinguishing an arc, if that is what causes the fault, or by more rapidly re-energizing the system after the fault or arc has been cleared.

It is known that when an arc occurs on a high voltage transmission line the ambient air surrounding the arc is heavily ionized so that its dielectric strength is greatly reduced. Consequently, frequently after an arc has been extinguished if a power line is immediately re-energized a second flashover or arc will be formed through the relatively low impedance ionized gas. Recognizing this fact, it will be appreciated that if ionization of the ambient by an arc is kept to a minimum in the first instance, and if the hot vapors surrounding the arc path area after flashover can be deionized more rapidly, faster final re-energization of the syste mcan be achieved.

It has been demonstrated that it takes longer to remove ionized hot vapor and gases from the ambient surrounding an insulator string in an extra high voltage system that has flashed over than is required in removing such gases from a flashover area in lower voltage systems. This phenomeon is due to the fact that a heavier arc is formed by the higher currents and it tends to burn or ionize more arc terminal material as well as tending to ionize more of the ambient due to the greater temperature and length of the arc. At the present time then, extra high voltage power transmission system designers are faced with the paradox of having to restore system service more rapidly following fault conditions, because of the heavier service load imposed on transmission lines, while at the same time recognizing the fact that such high voltages increase the time required to remove ionized gas from a flashover area so that normal power can be restored without causing a second flashover.

Although it has been recognized in the prior art that flashover or arcing across extra high voltage elongated insulators is the area of transmission systems most frequently subject to line to ground faults, little has been done to provide for accelerated deionization of the area surrounding such insulators to enable more rapid restoration of power to the system. With the relatively low voltages of the prior are systems only a relatively limited number of customers would be affected by a given power fault, therefore restoration of power within approximately 25 cycles or one-half second was deemed to be a reasonable or acceptable operating parameter. As a consequence, while prior art elongated high voltage insulators have been provided with arc-control apparatus to prevent flashovers across the surface of the insulators from damaging them, such insulators have not been designed with apparatus for rapidly deionizing the ambient arc vapor residue following a flashover.

Thus, an object of our invention is to provide apparatus for rapidly deionizing the ambient gases surrounding elongated high voltage insulators following a flashover.

A second important object of our invention is to provide mechanically simple ambient deionizing apparatus that will be economical to manufacture and relatively maintenance free in operation, because in practice the equipment will find application on the numerous remotely positioned suspension and pole type insulators of power transmission systems.

A further object of our invention is to provide, in combination with elongated extra high voltage insulators, apparatus for rapidly moving an arc around such insulators so that ionization of the ambient is inhibited and the ionized vapors that are formed are rapidly diffused so over-all system deionization following a fault is substantially improved.

A fuller understanding of the invention will be gained from the following description taken in conjunciion with the accompanying drawings wherein;

FIG. 1 is a side elevation of an extra high voltage elongated insulator string embodying one modification of the invention, as viewed perspectively along a power line supported by the insulator.

FIG. 2 is a top elevation of the arc terminal portions of the invention looking in the direction of the arrows 2—2 in FIG. 1.

FIG. 3 is a side elevation of a second modification of our invention also viewed in relation to an elongated extra high voltage insulator and associated power line and support tower crossarm.

FIG. 4 is a third embodiment of our invention depicting a side elevation of the invention in relation to an elongated extra high voltage insulator and an associated power line and power tower crossarm.

FIG. 5 is an expanded top perspective view of the modification of the invention shown in FIG. 4.

FIG. 6 is a top plan view of a modification of the invention shown in FIG. 4.

Referring to the suspension insulator arrangement depicted in FIG. 1, there is shown an insulator string 1 suspended from a power transmission line tower crossarm 2 and supporting a power line conductor 3. These elements of conventional power transmission systems do not form a critical part of our invention, but are merely shown to facilitate an understanding of an optimum application for the invention. Accordingly, it will be understood that they may be of any conventional design. Attached to insulator string 1 at longitudinally spaced points along its axis are elongated loop-shaped electrically conductive arc terminals 4, 5, and 6.

Referring to FIG. 2, which shows a top view of the arc terminal members 4, 5, and 6, it will be seen that they are each formed to have a loop portion that is interrupted by a dielectric gap 7, which in the embodiment shown is simply an air gap. However, as will become apparent during the course of the following discussion, these dielectric gaps may be filled with other suitable insulating material in certain applications of the invention. In addition to the loop-shaped portion and the dielectric gap 7, each arc terminal is provided with a tail portion 8 that extends radially inward from one side of the dielectric gap. The innermost end of each tail portion 8 is attached to the insulator string 1 in such a manner that the respective loop portion of their arc terminals is supported in planes that are generally perpendicular to the longitudinal axis of insulator string 1. Tail portions 8 may be attached to the insulator string 1 in any conventional manner, such as by welding or by providing a bolt and nut fastening assembly (not shown).

In operation, the loop-shaped arc terminals 4, 5, and 6 provide two desirable results. When an arc, here depicted by the dotted line 9, is drawn between transmission line 3 and tower crossarm 2 due to a voltage surge caused by lightning striking a portion of the system or perhaps due to an extra high voltage switching transient, the arc may tend to flash across the end insulators of insulator string 1. However, the outermost arc terminals 4 and 6 provide a low impedance conductive path along their respective tail portions 8 to their respective loop portions. Consequently, the arc will follow this path and is quickly moved to the loop portion of the arc terminals 4 and 6 from which it jumps across the intervening air gaps to arc terminal 5. While the arcing current is flowing through tail portions 8 of arc terminals 4 or 6, a magnetic field is induced by the arcing current in its surrounding ambient which impels the arc to rotate rapidly around the loop shaped terminals 4, 5, and 6. Actually, since arc 9 usually enters and leaves a given arc terminal, 4–6, at angularly displaced points thereon, there will always be a horizontal segment of arcing current that electrodynamically imparts a rotating force to the arc 9, even when no arc current flows in tail portions 8 of terminals 4 and 6. The dielectric gaps 7 are designed so that they are short enough to allow the rotating arc to be driven across the gap if it is not extinguished during one rotation through 360 degrees, because it is desirable for purposes of our invention to move the arc as rapidly as possible. The rotational motion thus imparted to the arc has two very desirable effects: First, the amount of terminal material that is ionized by the arc is reduced to a minimum because the arc is prevented from excessively heating any given portion of the terminal. Second, the rapid movement of the arc serves to diffuse the ambient ionized vapor that is formed so that when the arc is eventually extinguished the ambient will be more rapidly deionized. Thus, it can be seen that two primary objects of our invention are satisfied by the structure shown in FIG. 1.

It will be noted that the arc terminal 5, located near the center of insulator string 1, has a diameter substantially greater than the respective diameters of arc terminals 4 and 6. This arrangement is a preferred embodiment of our invention because it causes an arc drawn across the arc terminals 4, 5, and 6 to be rapidly bent outwardly away from insulator string 1. This bending action also has two desirable effects. First, it reduces the probability or likelihood of damage being done to the discs of insulator string 1 by the arc; secondly, and this is an important feature of our invention, the lateral extension of the arc reduces the concentration of heated ionized vapor that is formed in any single vertical plane through the arc 9. Therefore as heated vapor rises from the lower end of the arc 9 toward tower crossarm 2 it enters a relatively cool area more rapidly than would be the case if the arc had been allowed to retain a more nearly vertical, or straight-line, form between arm 2 and line 3. It will be understood that although only three terminals 4–6 are illustrated in the preferred embodiment of our invention shown in FIG. 1, additional terminals may be employed in other modifications without departing from the scope of the invention.

Referring now to FIG. 3, wherein like parts to those depicted in FIG. 1 are designated with like numerals, there is again shown a suspension insulator string 1 hanging from a tower crossarm 2 and supporting a power line conductor 3. Electrically conductive rods 10, 11 and 12 are each attached at their respective innermost ends to longitudinally spaced points of the insulator string 1. The rods 10–12 may be so attached in any conventional manner, such as by welding, to the metallic coupling portions of insulator string 1 so that they radiate outwardly from string 1 in planes that are substantially perpendicular to the longitudinal axis thereof. Again, in this embodiment of our invention, the centermost rod 11 is substantially longer than the two end rods 10 and 12 so that when an arc, depicted by the dotted line 9, is drawn across the outer ends of the rods, it is bent outwardly from the insulator string 1 with the same beneficial effects discussed above with reference to the embodiment shown in FIG. 1. Arcing terminals 13, 14 and 15 are provided respectively on the outer ends of rods 10, 11 and 12 and extend laterally therefrom toward the tower crossarm 2 and line conductor 3 to thus afford a relatively low impedance arc path between these two system elements. Consequently, when a flashover between crossarm 2 and conductor 3 occurs, the combined impedance reducing effect of the electrically conductive rods 10–12 and the low impedance path formed across the arc terminals 13–15 results in the arc being rapidly moved away from insulator string 1 to the position shown by the dotted line in FIG. 3; thus, the arc is quickly stretched in a lateral direction and such movement of the arc serves to diffuse the ionized vapors and accelerate their deionization in the manner described above with reference to the embodiment of our invention shown in FIG. 1.

The embodiment of the invention shown in FIG. 4 will also be discussed using the same reference numbers for like elements as was used in FIGS. 2 and 3. Thus, we have shown an insulator string 1 suspended from a tower crossarm 2 and supporting a transmission line conductor 3. At longitudinally spaced points along the vertical axis of insulator string 1 electrically conductive arc terminals 4, 5, and 6 are fastened in any suitable manner, such as by brazing, to the metallic coupling portions of insulator string 1 so that the terminals are supported in predetermined planes, here shown as substantially vertical to the longitudinal axis of insulator string 1.

Referring to FIG. 5, it will be seen that within limited portions of arc terminals 4, 5, and 6 are positioned, respectively, plate members 16, 17 and 18. In the embodiment shown, these plate members 16–18 are formed from solid electrical insulating material, but as will become apparent from the following discussion, these plate members may be formed of electrically conductive material or from perforate screen-like materials in other embodiments of the invention. The conductive arc terminals 4, 5, and 6 operate in the embodiment of FIGS. 4 and 5 in the same manner as described in relation to FIG. 1 when an arc 9 is drawn between crossarm 2 and line conductor 3, so that the arc is rapidly rotated around the periphery of the loop-shaped terminals to deionize the ambient. Again in this embodiment of the invention, the centermost terminal 5 has a diameter greater than the end terminals 4 and 6 so that the arc 9 will be bent outwardly away from the insulator string 1 with the same beneficial effects discussed with reference to the modification of the invention shown in FIG. 1.

The important feature of this modification of the invention is provided by the diffusing and cooling effect that plate members 16–18 have on hot vapors formed by an arc between cross 2 and line conductor 3. It will be seen by referring to FIG. 5, which is an expanded top perspective view of the plate members 16–18, that each such member is positioned on a different side of the longitudinal axis of insulator string 1. The angular displacement around the axis of string 1 of members 16–18 with respect to each other is determined such that each member is positioned in vertical columns or paths having a minimum of overlap. This arrangement causes the hot vapors formed by an arc 9 in the areas beneath each plate member 16–18 to be deflected around the respective plate members as the vapors rise, thus, forcing the vapors formed in the respective vertical segments bounded by the plate members 16–18 to rise in substantially separate paths through the ambient air. By thus channeling the flow of heated, ionized vapors, they are diffused and cooled more rapidly than would be the case if all of the heated vapor were allowed to rise in the same vertical column. In addition to the diffusing and cooling effect resulting from the location of plate members 16–18, the surfaces of these members afford substantial additional cooling action for the heated vapors, which further accelerates their deionization.

In FIG. 6 of the drawing there is shown a modification of the invention discussed above with reference to FIG. 4. In this modified form, the plate members 16–18 each completely surround the insulator string. For illustrative purposes, only one of the plate members 16 is depicted in FIG. 6, but it will be understood that all of the plate members 16–18 on a given string will have such a coextensive angular form. In this embodiment of the invention accelerated deionization of heated arc vapors is not afforded completely by forcing the vapors to rise in separate vertical channels but rather such an effect is attained by the baffling action of the solid plates 16–18 which temporarily retard the upward flow of heated vapor. This baffling action causes three cool gaps to be formed in a potential arc restrike path because as the heated vapors rise above each plate member 18, they are not immediately replaced by more heated vapor rising from a lower point along the insulator string 1. This plurality of gaps quickly deionizes the arc vapor and greatly reduces the likelihood of a second arc forming when power is restored to the system.

A further modification of the invention illustrated in FIG. 6 comprises the extended skirt portion 16b of plate member 16. As is the case with member 16, the skirt portion 16b may be formed by any suitably rigid material, such as ceramic insulating material, or metallic stock. The purpose of the skirt portions 16b is to further enhance the vapor baffling effect of the plate 16, so that the above described deionizing action will more rapidly follow quenching of arc 9. It will be understood that skirt portion 16 is fastened to ring 4 by any conventional clamping arrangement, or by brazing as shown in FIG. 6, such that ring 4 is exposed over a substantial part of its length on both the upper and lower sides of plate member 16. Thus an arc 9 will follow the same path illustrated in FIG. 4, rather than being forced to move completely around the outer periphery of skirt portion 16b.

As noted above in describing the embodiment of the invention illustrated in FIG. 4, in certain embodiments of the invention plate members 16–18 may be either wholly or partly perforated, rather than being unitary coextensive members as shown. It will be appreciated that such a structural modification of the invention is within its intended scope, because as hot ionized vapor rises through such perforations (not shown) in plate members 16–18, it would be rapidly cooled and deionized by contact with the surface of the plates.

While we have described the structure and operation of our invention with reference to particular embodiments thereof, it will be apparent to those skilled in the power transmission art that it also may be advantageously employed in other embodiments. Accordingly, therefore, we wish to have it understood that we intend herein to cover all such modifications as fall within the true spirit and scope of our invention.

What we claim as new and desire to secure by Letters Patent of the United States is:

1. Ambient deionizing apparatus for a high voltage insulator string comprising, in combination, an insulator string, an elongated electrically conductive arc terminal having a generally annular arc-running portion with a dielectric gap therein and a tail portion extending radially inward from one side of said gap, means attaching said tail portion to said insulator string intermediate the ends thereof whereby the annular portion of the terminal is supported in a plane substantially perpendicular to the longitudinal axis of said insulator string, said dielectric gap being short enough to enable an arc to be driven around the annular portion of the terminal by the magnetic field established by an arcing current flowing through the tail portion of said terminal toward either end of said insulator string.

2. Ambient deionizing apparatus for a high voltage insulator string comprising, in combination, an insulator string, a plurality of elongated electrically conductive arc terminals each having a generally annular arc-running portion with a dielectric gap therein and a tail portion extending radially inward from one side of said gap, means attaching the respective tail portions of each of said terminals to respective predetermined longitudinally spaced points of the insulator string whereby the annular portions of said terminals surround the insulator string and are supported in parallel planes substantially perpendicular to the longitudinal axis of said insulator string, each of said dielectric gaps being short enough to enable an arc to be driven around the respective annular portions of said terminals by the magnetic field established by an arcing current flowing through one or more of said tail portions toward either end of said insulator string.

3. Ambient deionizing apparatus for a high voltage insulator string comprising, in combination, an insulator string, an electrically conductive member having a substantially loop-shaped portion with a dielectric gap therein and a tail portion extending radially inward from one side of said gap, said tail portion being attached to said insulator string adjacent its mid-point to support the loop-shaped portion surrounding the string in a plane substantially perpendicular to the longitudinal axis of the insulator string, said dielectric gap being short enough to enable an arc to be rotated around the loop-shaped portion of the conductive member by a magnetic field established when arcing current flows through a portion of said member toward either end of said insulator string.

4. Ambient deionizing apparatus for a high voltage insulator string comprising, in combination, an insulator string, a plurality of electrically conductive members each having a substantially loop-shaped portion with a dielectric gap therein and a tail portion extending radially inward from one side of said gap, each of said tail portions being attached to said insulator string at respective longitudinally spaced points thereon to support their respective loop-shaped portions in parallel planes substantially perpendicular to the longitudinal axis of the insulator string, the dielectric gaps in each of said loop-shaped portions being short enough to enable an arc to be rotated around the loop-shaped portion of the conductive members by a magnetic field established when arcing current flows from at least one of said members toward either end of said insulator string, one of said conductive members being formed to have a loop-shaped portion of substantially greater diameter than the loop-shaped portion of the conductive members adjacent thereto whereby an arc drawn across all of said conductive members is spaced further from the longitudinal axis of said insulator string adjacent said one conductive member than it is spaced from said axis adjacent the conductive members of shorter diameter.

5. Ambient deionizing apparatus for a high voltage insulator string as defined in claim 4 wherein said one conductive member of greater diameter is the centermost conductive member.

6. Ambient deionizing means for an elongated high voltage insulator comprising, in combination, a plurality of insulator discs of substantially uniform diameter coupled together to form an insulator string, a plurality of plate members attached respectively to longitudinally spaced points of said insulator string and extending radially outward therefrom, the radially extended portions of said plate members having substantially larger diameters than the insulator discs whereby the ambient surrounding said discs is partially divided into longitudinally spaced open compartments by said plate members, and arc terminal means adjacent to the periphery of each of said plate members, said plate members each comprising a segment of a disc.

7. Ambient deionizing means as defined in claim 6, wherein each of said plate member disc segments is positioned in a substantially different vertical column around the longitudinal axis of said insulator string.

8. Ambient deionizing means for an elongated high voltage insulator comprising, in combination, a plurality of insulator discs of substantially uniform diameter coupled together to form an insulator string, a plurality of plate members attached respectively to longitudinally spaced points of said insulator string and extending radially outward therefrom, the radially extended portions of said plate members having substantially larger diameters than the insulator discs whereby the ambient surrounding said discs is partially divided into longitudinally spaced open compartments by said plate members, and arc terminal means adjacent to the periphery of each of said plate members, the arc terminal means adjacent each of the two endmost plate members having a substantially loop-shaped portion with a dielectric gap therein and a tail portion extending radially inward from one side of said gap, the dielectric gap in each of said loop portions being short enough to enable an arc to be rotated around the loop-shaped portion of the terminal means by a magnetic field established when arcing current flows from at least one of said terminal means toward either end of said insulator string.

9. Ambient deionizing means for an elongated high voltage insulator comprising, in combination, a plurality of insulator discs of substantially uniform diameter coupled together to form an insulator string, a plurality of plate members attached respectively to longitudinally spaced points of said insulator string and extending radially outward therefrom, the radially extended portions of said plate members having substantially larger diameters than the insulator discs whereby the ambient surrounding said discs is partially divided into longitudinally spaced open compartments by said plate members, and arc terminal means adjacent to the periphery of each of said plate members, said plate members being formed of electrical insulating material.

10. Ambient deionizing means for an elongated high voltage insulator comprising, in combination, a plurality of insulator discs of substantially uniform diameter coupled together to form an insulator string, a plurality of plate members attached respectively to longitudinally spaced points of said insulator string and extending radially outward therefrom, the radially extended portions of said plate members having substantially larger diameters than the insulator discs whereby the ambient surrounding said discs is partially divided into longitudinally spaced open compartments by said plate members, and arc terminal means adjacent to the periphery of each of said plate members, said plate members being formed of electrically conductive material and said arc terminal means being raised above the surface of said plate members to form elevated arc-running tracks around the outermost peripheral edges of both sides of said plate members.

11. Ambient deionizing means for an elongated high voltage insulator as defined in claim 10, wherein said arc terminal means comprises a loop-shaped conductive member.

12. Ambient deionizing means for an elongated high voltage insulator as defined in claim 11, wherein said loop-shaped conductive member is surrounded by a skirt member extending radially outward therefrom.

References Cited

UNITED STATES PATENTS

| | | | |
|---|---|---|---|
| 1,128,424 | 2/1915 | Duncan | 174—141 |
| 1,250,387 | 12/1917 | Thomas. | |
| 1,501,688 | 7/1924 | Steinberger. | |
| 1,772,947 | 8/1930 | Hoffmann | 174—141 |
| 1,888,715 | 11/1932 | Fleming | 174—141 |
| 1,972,613 | 9/1934 | Austin | 174—141 |

FOREIGN PATENTS

| | | |
|---|---|---|
| 220,210 | 3/1962 | Austria. |
| 244,420 | 1/1966 | Austria. |
| 515,519 | 11/1920 | France. |
| Ad. 24,653 | 5/1922 | France. |
| 897,229 | 5/1944 | France. |
| 331,029 | 6/1930 | Great Britain. |
| 221,722 | 9/1942 | Switzerland. |
| 225,651 | 5/1943 | Switzerland. |

LARAMIE E. ASKIN, Primary Examiner

U.S. Cl. X.R.

174—144